United States Patent
Yang et al.

(10) Patent No.: US 11,746,193 B2
(45) Date of Patent: Sep. 5, 2023

(54) BLOCK-MODIFIED POLYSILOXANES AND COMPOSITIONS FORMED THEREOF

(71) Applicant: WACKER CHEMIE AG, Munich (DE)

(72) Inventors: Heng Yang, Shanghai (CN); Shuai Tian, Shanghai (CN); Zhongliang Sun, Shanghai (CN)

(73) Assignee: WACKER CHEMIE AG, Munich (DE)

( * ) Notice: Subject to any disclaimer, the term of this patent is extended or adjusted under 35 U.S.C. 154(b) by 118 days.

(21) Appl. No.: 17/292,168

(22) PCT Filed: Nov. 20, 2018

(86) PCT No.: PCT/CN2018/116374
§ 371 (c)(1),
(2) Date: May 7, 2021

(87) PCT Pub. No.: WO2020/102966
PCT Pub. Date: May 28, 2020

(65) Prior Publication Data
US 2021/0388163 A1 Dec. 16, 2021

(51) Int. Cl.
| | |
|---|---|
| *C08G 77/452* | (2006.01) |
| *C08G 77/46* | (2006.01) |
| *C08L 83/08* | (2006.01) |
| *D06M 15/643* | (2006.01) |
| *C08G 77/44* | (2006.01) |
| *C08L 83/12* | (2006.01) |
| *D06M 101/32* | (2006.01) |
| *C08G 77/26* | (2006.01) |

(52) U.S. Cl.
CPC .......... *C08G 77/452* (2013.01); *C08G 77/44* (2013.01); *C08G 77/46* (2013.01); *C08L 83/08* (2013.01); *C08L 83/12* (2013.01); *D06M 15/6436* (2013.01); *C08G 77/26* (2013.01); *D06M 2101/32* (2013.01); *D06M 2200/50* (2013.01)

(58) Field of Classification Search
CPC ....... C08G 77/44; C08G 77/452; C08G 77/46
USPC .......................................................... 528/38
See application file for complete search history.

(56) References Cited

U.S. PATENT DOCUMENTS

| | | | | |
|---|---|---|---|---|
| 4,366,001 A * | 12/1982 | Ona | .............. | D06M 15/65 |
| | | | | 524/588 |
| 4,533,714 A * | 8/1985 | Sebag | .............. | C08G 77/382 |
| | | | | 528/33 |
| 4,584,342 A * | 4/1986 | Kondow | .............. | C08L 83/08 |
| | | | | 528/21 |
| 5,807,956 A * | 9/1998 | Czech | .............. | D06M 15/6436 |
| | | | | 8/115.64 |
| 6,515,094 B2 * | 2/2003 | Czech | .............. | C09D 183/08 |
| | | | | 528/34 |
| 6,730,766 B2 * | 5/2004 | Schattenmann | .... | C08L 83/08 |
| | | | | 556/408 |
| 10,052,582 B1 * | 8/2018 | Liu | .............. | B01D 71/70 |
| 2003/0045666 A1 | 3/2003 | Schattenmann et al. | | |
| 2004/0225099 A1 | 11/2004 | Hohberg et al. | | |
| 2006/0100396 A1 | 5/2006 | Guth et al. | | |

FOREIGN PATENT DOCUMENTS

| | | |
|---|---|---|
| CN | 100368467 C | 2/2008 |
| CN | 103214679 A | 7/2013 |
| DE | 19817776 A1 | 10/1999 |
| JP | 10195202 A | 7/1998 |
| JP | 11199691 A | 7/1999 |
| JP | 11288087 A | 10/1999 |
| JP | 2000143797 A | 5/2000 |
| JP | 2012107127 A | 6/2012 |
| WO | 2017182061 A1 | 10/2017 |
| WO | 2018183057 A1 | 10/2018 |

OTHER PUBLICATIONS

Product data sheet for Gelest DMS-A21 (no date).*
Product data sheet for Gelest DMS-E21 (no date).*
Supplemental European Search Report for EP Application 18940757.0, dated Apr. 20, 2021.

* cited by examiner

*Primary Examiner* — Marc S Zimmer
(74) *Attorney, Agent, or Firm* — BROOKS KUSHMAN P.C.

(57) ABSTRACT

Block-modified polysiloxanes and compositions comprising the block-modified polysiloxanes are useful in the field of textile finishing. Emulsions comprising the compositions have a very small and narrowly distributed particle size which increases penetration, and provide good softening properties coupled with good hydrophilicity.

20 Claims, No Drawings

BLOCK-MODIFIED POLYSILOXANES AND COMPOSITIONS FORMED THEREOF

CROSS REFERENCE TO RELATED APPLICATIONS

This application is the U.S. National Phase of PCT Appln. No. PCT/CN2018/116374 filed Nov. 20, 2018, the disclosure of which is incorporated in its entirety by reference herein.

BACKGROUND OF THE INVENTION

1. Field of the Invention

The present invention relates to the field of silicone-based softeners for textile finishing.

2. Description of the Related Art

CN100368467C discloses a composition for fiber treatment and finishing that comprises quaternized aminoalkylpolysiloxanes, and nonionogenic interface-active compounds containing ethylene oxide and propylene oxide (EO/PO) units. According to Example 1 therein, the quaternized aminoalkylpolysiloxanes were obtained by the acid-catalyzed reaction of N,N,N',N'-tetramethyl-1,6-hexanediamine, JEFFAMINE ED600 polyetheramine and an epoxyalkyl silicone oil.

U.S. Pat. No. 5,807,956 discloses a copolymer of $(AB)_nA$ type comprising polysiloxane and polyetheramine units, which can be used as a softener that imparts durable hydrophilicity. The polysiloxane units have the general formula $[X(C_aH_{2a}O)_bR_2 [SiO(R^1)_2]_c Si(R^1)_2 R^2(OC_aH_{2a})_b X]$, and the polyetheramine units have the general formula $[YO(C_aH_{2a}O)_dY]$, where X is a ring opened epoxide, and Y is a secondary or tertiary amine.

The existing softener products available on the market rarely offer both a soft feel and excellent hydrophilicity.

SUMMARY OF THE INVENTION

The present invention relates to a block-modified polysiloxane. Compositions comprising the block-modified polysiloxane can be used in the field of textile finishing. Emulsions comprising the compositions have a very small and narrowly distributed particle size and superior penetration, and offer prominent softening properties and good hydrophilicity.

DETAILED DESCRIPTION OF THE PREFERRED EMBODIMENTS

The present invention relates to a block-modified polysiloxane, which is a linear or cyclic polysiloxane copolymer and contains repeating structural units having the following structural formula (1) or (2):

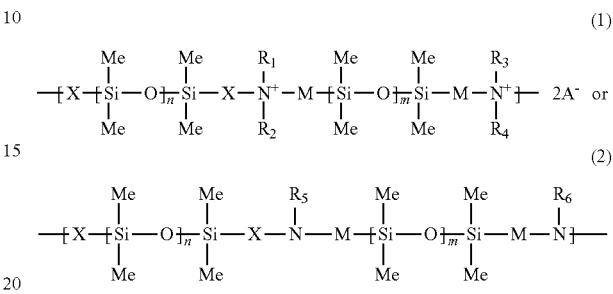

where X is a divalent hydrocarbon radical having at least 3 carbon atoms, which contains at least one hydroxyl group and is interrupted by an oxygen atom, and the X groups in the repeating units can be the same or different;

M is a divalent hydrocarbon radical, or $C_aH_{2a}$, where a is a positive integer between 1 and 10, preferably between 2 and 4, and the M groups in the repeating units can be the same or different;

N stands for nitrogen;

m is a positive integer between 10 and 200, preferably between 20 and 150, more preferably between 30 and 60;

n is a positive integer, between 50 and 350, preferably between 70 and 300, more preferably between 80 and 200;

Me denotes methyl;

$R_1$, $R_2$, $R_3$ and $R_4$ can be the same or different, and are each independently an alkyl group having from 1 to 4 carbon atoms or a benzyl group or H;

$R_5$ and $R_6$ can be the same or different, and are each independently H, or an alkyl group having from 1 to 20 carbon atoms, which can optionally be substituted by oxygen atoms;

$A^-$ is an inorganic or organic anion.

The block-modified polysiloxane above, can contain repeating structural units having the following structural formula (3) or (4):

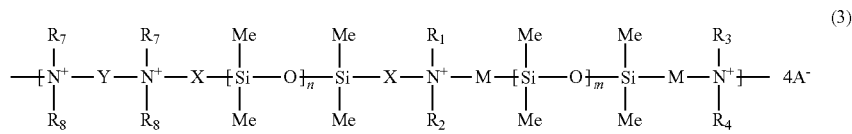

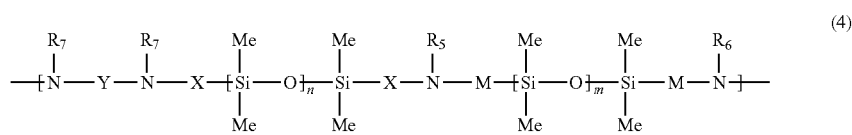

where Y is the structure —B-[EO]$_v$[PO]$_w$—,
where EO is ethylene oxide and PO is propylene oxide;
B is a linear or branched C1-C6 alkylene group, preferably a C2-C4 alkylene group;
v is a number between 0 and 200, preferably between 1 and 50, more preferably between 5 and 30;
w is a number between 0 and 200, preferably between 1 and 20, more preferably between 1 and 10;
v+w≥1, preferably v+w≥9, more preferably 20≥v+w≥10:
v/w is between 1.1 and 5, preferably between 2 and 4, more preferably between 2 and 3;
$R_6$ and $R_7$ can be the same or different, and are each independently H, or an alkyl group having from 1 to 20 carbon atoms;
$A^-$ is an inorganic or organic anion, preferably acetate.
In block-modified polysiloxane above, X is a ring opened epoxide selected from the group consisting of
$(C_aH_{2a}O)_b$ $CH_2CH(OH)(CH_2)$,
$(C_aH_{2a}O)_b$ $CH(OH)CH_2$—,
$(C_aH_{2a}O)_b$—$CH(CH_2OH)(CH_2)_f$$CH(CH_2OH)$—,
$(C_aH_{2a}O)_b$—$CH_2CH(OH)(CH_2)_f$$CH(CH_2OH)$—,
$(C_aH_{2a}O)_b$—$(CH_2)_f$$OCH_2CH(OH)CH_2$—, and
$(C_aH_{2a}O)_b$ $(CH_2)_f$$OCH_2CH(CH_2(OH))$—,
where a can be the same or different, and is an integer between 2 and 4; b can be the same or different, and is an integer between 0 and 100; f is an integer between 2 and 6.

A composition comprising the block-modified polysiloxane above.

A composition comprising the block-modified polysiloxane above and Component (C)—aminoalkyl silicone oil.

An emulsion composition comprising the block-modified polysiloxane above and Component (C)—aminoalkyl silicone oil.

The invention further pertains to a composition containing the block-modified polysiloxane above, prepared from the reaction including raw materials:
Component (A)—epoxyalkyl silicone oil;
Component (B)—polyetheramine;
Component (C)—aminoalkyl silicone oil,
and wherein in the block-modified polysiloxane above or the compositions above, the reaction is an epoxy ring-opening reaction.

Component (A), epoxyalkyl silicone oil, of the present invention is a di-epoxyalkyl-terminated polydimethylsiloxane, preferably a di-epoxyalkyl-terminated polydimethylene having the following structural formula (5):

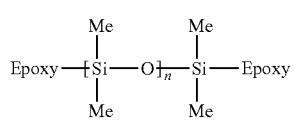

(5)

n is a positive integer, between 50 and 350, preferably between 70 and 300, more preferably between 80 and 200;
Me denotes methyl;
Epoxy is selected from the group consisting of
$(C_aH_{2a}O)_b$ $CH_2CHO(CH_2)$,
$(C_aH_{2a}O)_b$ $CHOCH_2$,
$(C_aH_{2a}O)_b$—$CH(CH_2O)(CH_2)_f$$CH(CH_2O)$,
$(C_aH_{2a}O)_b$—$CH_2CHO(CH_2)_f$$CH(CH_2O)$,
$(C_aH_{2a}O)_b$—$(CH_2)_f$$OCH_2CHOCH_2$— and
$(C_aH_{2a}O)_b$ $(CH_2)_f$$OCH_2CH(CH_2O)$,
where a is an integer between 2 and 4; b can be the same or different, and is an integer between 0 and 100; f is an integer between 2 and 6.

In compositions above, the epoxy in Component (A), epoxyalkyl silicone oil, is preferably selected from the group consisting of
ω-(3,4-epoxycyclohexyl)alkylene,
β-(3,4-epoxycyclohexyl)ethylene,
β-(3,4-epoxycyclohexyl)-β-methylethylene, and
β-(3,4-epoxy-4-methylcyclohexyl)-β-methylethylene.

Component (B), polyetheramine, of the present invention is a type of substance having the structural formula $NR_a$—B-[EO]$_v$[PO]$_w$—$NR_a$, where
v is a number between 0 and 200, preferably between 1 and 50, more preferably between 5 and 30;
w is a number between 0 and 200, preferably between 1 and 20, more preferably between 1 and 10;
B is a linear or branched C2-C6 alkylene group, preferably a propylene group;
R can be the same or different, and is independently H, or an alkyl group having from 1 to 6 carbon atoms;
a can be the same or different, and is an integer between 1 and 4.

Component (C), an aminoalkyl silicone oil of the present invention, is a di-aminoalkyl-terminated polydimethylsiloxane, preferably di-3-aminopropyl-terminated polydimethylsiloxane, more preferably di-3-aminopropyl-terminated polydimethylsiloxane having the following structural formula (6):

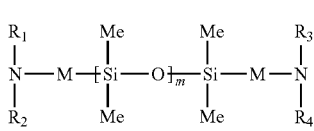

(6)

M is a divalent hydrocarbon radical, or $C_aH_{2a}$, where a is a positive integer between 1 and 10, preferably between 2 and 4, and the M groups in the repeating units can be the same or different;
$R_1$, $R_2$, $R_3$ and $R_4$ can be the same or different, and are each independently an alkyl group having from 1 to 4 carbon atoms or a benzyl group or H;
m is a positive integer between 10 and 200, preferably between 20 and 150, more preferably between 30 and 60;
Me denotes methyl.

The block-modified polysiloxane above or the compositions above, have a content of the unopened epoxide groups of less than 0.05 mmol/g, preferably less than 0.03 mmol/g, more preferably 0.01 mmol/g, measured by nuclear magnetic resonance (NMR).

The block-modified polysiloxane above or the compositions above, which have an amine value of from 0.01 to 0.5 meg/g, preferably from 0.03 to 0.3 meg/g, more preferably from 0.05 to 0.2 meg/g, more preferably from 0.1 to 0.2 meg/g, measured by nuclear magnetic resonance (NMR).

The amine value denotes how many milligrams of potassium hydroxide are equivalent to the amine content of one gram of substance.

The block-modified polysiloxane above or the compositions above preferably have a solids content of from 30 to 70 wt %, more preferably from 40 to 60% wt %, most preferably from 45 to 55 wt %.

The solids content herein is measured as follows: 2 g of the sample is placed on a watch glass, dried at 105° C. for 2 hours, and then weighed.

In the compositions above, the molar ratio of the epoxide groups in Component (A), epoxyalkyl silicone oil, to the amino-functional groups in Component (B), polyetheramine, ranges from 1.01 to 2, preferably from 1.1 to 1.5.

In the compositions above, the molar ratio of the epoxide groups in Component (A), epoxyalkyl silicone oil, to the amino-functional groups in Component (C), aminoalkyl silicone oil, ranges from 1 to 5, preferably from 1.5 to 3.5.

In the compositions above, the molar ratio of the amino-functional groups in both Component (B) polyetheramine and Component (C) aminoalkyl silicone oil to the epoxide groups in Component (A), epoxyalkyl silicone oil, ranges from 1.01 to 3, preferably from 1.1 to 2, more preferably from 1.1 to 1.4.

In the compositions above, the molar ratio of the amino-functional groups in Component (C), aminoalkyl silicone oil, to the amino functional groups in Component (B), polyetheramine, ranges from 0.2 to 0.8, preferably from 0.4 to 0.7.

In the compositions above, the weight ratio of Component (B), based on the total weight of Component (A) epoxyalkyl silicone oil, Component (B) polyetheramine, and Component (C) aminoalkyl silicone oil, ranges from 1 to 15 wt %, preferably from 1.5 to 12 wt %, more preferably from 5 to 10 wt %.

In the compositions above, the weight ratio of Component (C), based on the total weight of Component (A) epoxy alkyl silicone oil, Component (B) polyetheramine, and Component (C) aminoalkyl silicone oil, ranges from 5 to 30 wt %, preferably from 5 and 20 wt %, more preferably from 10 to 15 wt %.

The block-modified polysiloxane or the compositions above may be prepared through the following process:

Component (A), epoxyalkyl silicone oil, is first reacted with Component (B), polyetheramine, and then Component (C), aminoalkyl silicone oil, is added into the system for further reaction.

The block-modified polysiloxane or the compositions above may be prepared through the following process:

Component (A), epoxyalkyl silicone oil, is first reacted with Component (C), aminoalkyl silicone oil, and then component (B), polyetheramine, is added into the system for further reaction.

The block-modified polysiloxane or the compositions above may be prepared through the following process:

Component (A), epoxyalkyl silicone oil, Component (B), polyetheramine, and Component (C), aminoalkyl silicone oil, are simultaneously added into the system for reaction.

The invention further relates to an emulsion, which comprises the block-modified polysiloxane above and has a particle size D50 of from 10 to 100 nm, preferably from 10 to 50 nm; and a emulsion, which comprises the composition above and has a particle size D50 of from 10 to 100 nm, preferably from 10 to 50 nm, more preferably from 10 to 29 nm.

In the emulsion above the span of the particle size distribution is less or equal to 1.5, preferably less or equal to 1.35.

Analysis the particle size is by Dynamic light scattering in the present invention.

Referenced Standards: The method complied with standards ISO 13321, ISO 22412 and 21 CFR Part 11.

Equipment used in Malvern Nano ZS90 (available from Malvern Instruments Ltd.)

Determination method: At 25° C., the samples were placed in the measuring device. The span of the particle size distribution in the present invention is defined as: (D90-D10)/D50, where D50 is defined as the value of the particle size at 50% in the cumulative distribution. For example, if D50=0.68 μm, then 50% of the particles in the sample are larger than 0.68 μm, and 50% smaller than 0.68 μm. D10 or D90 is defined as the value of the particle size at 10% or 90% in the cumulative distribution respectively. For example, if D10=0.1 μm, then 10% of the particles in the sample are smaller than 0.1 μm; if D90=1 μm, then 90% of the particles in the sample are smaller than 1 μm.

The emulsions above may further comprises nonionic surfactants of alkyl alcohol polyoxyethylene ether and/or alkyl acid polyoxyethylene ester types.

In the emulsions above, the nonionic surfactants have an HLB value of from 8 to 16, preferably from 9 to 15, more preferably from 10 to 14.

In the emulsions above, the solids content ranges from 10 to 30 wt %, preferably from 10 to 20 wt %, more preferably from 13 to 18 wt %.

The invention further pertains to the use of the block-modified polysiloxanes above in the field of textile finishing, use of the compositions above in the field of textile finishing, use of the emulsions above in the field of textile finishing, and.

use of the compositions above in textile softeners, fabric softeners, smoothing agents and finishing.

Textiles are made of cellulose fibers, protein fibers, synthetic fibers or a mixture thereof, and have a fabric structure. Raw materials used in the invention are as follows:

HP80X: a hydrogen-terminated polydimethylsiloxane from Jiangxi Xinjiayi New Materials Co., Ltd., having a hydrogen content of 0.03 wt % and a molecular weight (Mw) of 6666.6 g/mol.

HYC-12: a hydrogen-terminated polydimethylsiloxane from Zhejiang Sucon Silicone Co., Ltd., having a hydrogen content of 0.016 wt % and a molecular weight (Mw) of 12500 g/mol.

HP1000: a hydrogen-terminated polydimethylsiloxane from Jiangxi Xinjiayi New Materials Co., Ltd., having a hydrogen content of 0.01 wt % and a molecular weight (Mw) of 20000 g/mol.

AGE: a commercially available allyl glycidyl ether, having a molecular weight (Mw) of 114.14 g/mol.

Pt catalyst: a chloroplatinic acid.

JEFFAMINE ED600: a polyetheramine from Huntsman, having the general formula $NH_2CH(CH_3)CH_2$-$[EO]_v$-$[PO]_w$-$NH_2$, where EO stands for $OCH_2CH_2$, an ethylene oxide unit, PO stands for $OCH(CH_3)CH_2$, a propylene oxide unit, v≈9 and W≈3.6.

WACKER FLUID NH 40D: an aminoalkyl silicone oil, specifically di-3-aminopropyl terminated polydimethylsiloxane from Wacker Chemicals, having a molecular weight of from 2900 to 3300 g/mol and an amine value of from 0.77 to 0.91 mmol/g.

WACKER FLUID NH 130D: an aminoalkyl silicone oil, specifically di-3-aminopropyl terminated polydimethylsiloxane from Wacker Chemicals, having a molecular weight of from 9500 to 12000 g/mol and an amine value of from 0.16 to 0.21 mmol/g.

RH-NB-8168-9: a linear multi-component copolymer block-modified silicone from Ningbo Runhe High-Tech Materials Co., Ltd., containing units that enable di-epoxyalkyl-terminated silicone oil to undergo ring-opening reaction with polyetheramine.

Emulsifier 1: an iso-tridecanol polyoxyethylene ether from Sasol, having 10 EO units and an HLB value of 13.5.

Emulsifier 2: an iso-tridecanol polyoxyethylene ether from Sasol, having 5 EO units and an HLB value of 10.5.

Examples: Preparation of Epoxyalkyl Silicone Oils

TABLE 1

|  | epoxyalkyl silicone oil 1 | epoxyalkyl silicone oil 2 | epoxyalkyl silicone oil 3 |
|---|---|---|---|
| HP80X (in parts by weight) | 150 | | |
| HYC-12 (in parts by weight) | | 500 | |
| HP1000 (in parts by weight) | | | 150 |
| AGE (in parts by weight) | 6.68 | 9.60 | 2.23 |
| Pt catalyst | Appropriate amount | Appropriate amount | Appropriate amount |
| Epoxy value (mmol/g) | 0.3 | 0.13 | 0.08 |

According to Table 1, HP80X, HYC-12 and HP1000 were reacted with AGE for a period of time under a nitrogen atmosphere at temperatures from 80 to 150° C. in the presence of the platinum catalyst. The resulting mixture was then evaporated by vacuum distillation at 135° C. to obtain epoxyalkyl silicone oil 1-3. The concentration of Pt during the reaction was 6 ppm. Epoxyalkyl silicone oil 1 or 2 or 3 is a di-epoxyallyl-terminated silicone oil.

Examples: Preparation of Block-Modified Polysiloxane and Compositions Formed Thereof

TABLE 2

|  | Composition 1 Functional groups mmol | Composition 2 Functional groups mmol | Composition 3 Functional groups mmol | Composition 1 dosage (wt) | Composition 2 dosage (wt) | Composition 3 dosage (wt) |
|---|---|---|---|---|---|---|
| Epoxyalkyl silicone oil 1 | 27.31 | | | 39.79% | | |
| Epoxyalkyl silicone oil 2 | | 19.20 | | | 52.62% | |
| Epoxyalkyl silicone oil 3 | | | 8.20 | | | 41.27% |
| WACKER FLUID NH 40D | 11.38 | 7.98 | | 6.37% | 4.60% | |
| WACKER FLUID NH 130D | | | 3.42 | | | 7.78% |
| JEFFAMINE ED 600 | 22.76 | 16.01 | 6.82 | 3.39% | 2.46% | 0.95% |
| Isopropyl alcohol | | | | 49.55% | 40.32% | 50.00% |
| Acetic acid | | | | 0.91% | 0.64% | 0.26% |
| Solids content | | | | 50% | 60% | 50% |

The preparation process of the compositions according to Table 2 is as follows:
(1) the epoxyalkyl silicone oils, polyetheramine and isopropyl alcohol were reacted for 2 hours under a nitrogen atmosphere at 80° C.;
(2) an aminoalkyl silicone oil (such as WACKER FLUID NH 40D or WACKER FLUID NH 130D) was added into, and reacted for 2.5 to 5 hours with the product of step (1) at controlled temperatures from 84 to 90° C.;
(3) acetic acid was added into the product of step (2) while stirred slowly to react for a certain period of time until the pH value was adjusted to about 7;
(4) the mixture of step (3) was cooled down to obtain the block-modified polysiloxane of the invention and compositions formed thereof.

Examples: Preparation of Softener Emulsions (Examples and Comparative Examples)

TABLE 3

|  | Emulsion Comparative Example 1 | Emulsion Comparative Example 2 | Emulsion Example 1 | Emulsion Example 2 |
|---|---|---|---|---|
| WACKER NH 130D (in parts by weight) | 17.7 | | | |
| RH-NB-8168-9 (in parts by weight) | | 17.7 | | |
| Composition 1 (in parts by weight) | | | 17.7 | |
| Composition 2 (in parts by weight) | | | | 17.7 |
| Emulsifier 1 (in parts by weight) | 4.1 | 4.1 | 4.1 | 4.1 |
| Emulsifier 2 (in parts by weight) | 4.2 | 4.2 | 4.2 | 4.2 |
| Acetic acid (in parts by weight) | 1.6 | 1.6 | 1.6 | 1.6 |
| Water (in parts by weight) | 72.4 | 72.4 | 72.4 | 72.4 |
| Solids content | 20.31 wt % | 14.86 wt % | 15.95 wt % | 16.39 wt % |

TABLE 3-continued

|  | Emulsion Comparative Example 1 | Emulsion Comparative Example 2 | Emulsion Example 1 | Emulsion Example 2 |
|---|---|---|---|---|
| Particle size D10/nm | 204 | 172 | 13 | 14 |
| Particle size D50/nm | 341 | 256 | 20 | 21 |
| Particle size D90/nm | 572 | 495 | 40 | 39 |
| pH | 5 | 5 | 5 | 5 |
| Appearance | milky, white | bluish milky white | clear | clear |

TABLE 3-1

| | WACKER NH 130D | RH-NB-8168-9 | Composition 1 | Composition 2 | Composition 3 |
|---|---|---|---|---|---|
| The weight ratio of the polyetheramine (ED600) to the total charge of the epoxyalkyl silicone oils, polyetheramine and aminoalkyl silicone oil | 0 | / | 6.85% | 4.12% | 1.90% |
| The weight ratio of the aminoalkyl silicone oil (NH40D or 130D) to the total charge of the epoxyalkyl silicone oils, polyetheramine and aminoalkyl silicone oil | 0 | 0 | 12.85% | 7.71% | 15.56% |
| Amine value | 0.16–0.21 mmol/g | 0.2593 meq/g | 0.1627 meq/g | 0.1390 meq/g | 0.0140 mmol/g |

According to Table 3, the inventors of the present invention unexpectedly found that Emulsion Examples 1 and 2 led to microemulsions having a particle size of about 20 nm, while Comparative Example 2 comprising RH-NB-8168-9 only led to a regular emulsion having a particle size of about 250 nm. As shown in Table 3, the block-modified polysiloxanes of the invention have properties that are quite different from those of RH-NB-8168-9 and WACKER NH 130D as a comparison, exhibiting for example remarkably improved self-emulsification ability. With good thermal stability and long-term storage stability, the microemulsions have a small particle size, which enables easier contact with the microstructure of textiles, and thus better penetration.

Softness Finishing Process:
Textile Under Test: Polyester Flannel
Preparation of finishing liquid→impregnation for 5 min, bath ratio 1:20→spinning for 5 min (liquid entrainment rate of 250% to 300%)→oven drying (at 1050° C. for 20 min) setting (at 180° C. for 30 s)→room temperature balance-→hand feel evaluation

TABLE 4

| Mass of textile (g) | Dispersion | Dosage of emulsion (g) |
|---|---|---|
| 6.25 | Emulsion Comparative Example 1 | 0.24 |
| 6.23 | Emulsion Comparative Example 2 | 0.34 |
| 5.88 | Emulsion Example 1 | 0.29 |
| 5.86 | Emulsion Example 2 | 0.30 |

Hand Feel Test:

TABLE 5

| | Emulsion Comparative Example 1 | Emulsion Comparative Example 2 | Emulsion Example 1 | Emulsion Example 2 |
|---|---|---|---|---|
| Softness | 4 | 2 | 5 | 4 |
| Silkiness | 5 | 2 | 3 | 4 |
| Hand feel evaluation | Soft and slippery | No highlights | Soft and fluffy | Soft and slippery |

According to Table 5, the inventors of the present invention unexpectedly found that Emulsion Example 1 offered a softer and silky hand, which made its softening properties prominent. Compared with Emulsion Example 1, Emulsion Comparative Example 2, which also contains units that enable the epoxyalkyl silicone oil to react with polyetheramine, failed to convey a soft and slippery hand.

Hydrophilicity Test:
According to AATCC Test Method 79-2010, Absorbency of Bleached Textiles, a drop of water is dripped with a dropper onto the surface of a horizontally spread textile from 3 cm high above the textile, and the moisturizing time is the time elapsed for the reflective surface of the waterdrop to disappear. The shorter the moisturizing time, the stronger the hydrophilicity of the textile.

The hydrophilicity is indicated by a 5-level scale, where 1 is the worst and 5 is the best. Specifically, moisturizing time $(t_m)$<5 s scores 5; 5 s<$t_m$<20 s scores 4; 20 s<$t_m$<1 min scores 3; 1 min<$t_m$<5 min scores 2; $t_m$>5 min scores 1.

TABLE 6

| Textile finishing agent | Moisturizing time | Hydrophilicity level |
|---|---|---|
| Emulsion Comparative Example 1 | >5 min | Level 1 |
| Emulsion Comparative Example 2 | 15 s | Level 4 |
| Emulsion Example 1 | 50 s | Level 3 |
| Emulsion Example 2 | 25 s | Level 3 |

According to Table 6, the inventors of the present invention unexpectedly found that Emulsion Examples 1 and 2 did not exhibit a significant reduction in hydrophilicity, while having both good hydrophilicity and prominent soft properties, which mean an excellent overall performance profile.

What is claimed is:
1. A block-modified polysiloxane, which is a linear or cyclic polysiloxane copolymer and comprises repeating structural units having the following structural formula (1):

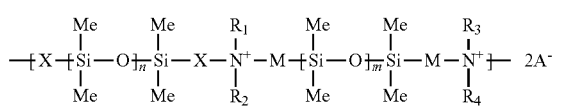

where X is a divalent hydrocarbon radical having at least 3 carbon atoms, which contains at least one hydroxyl group and is interrupted by an oxygen atom, and the X groups in the repeating units are the same or different;
M is a divalent hydrocarbon radical of the formula $C_aH_{2a}$, where a is a positive integer between 1 and 10, and the M groups in the repeating units are the same or different;
N is a nitrogen atom;
m is a positive integer between 10 and 200;
n is a positive integer, between 50 and 350;
Me denotes methyl;
$R_1$, $R_2$, $R_3$ and $R_4$ are the same or different, and are each independently an alkyl group having from 1 to 4 carbon atoms or a benzyl group or H;

$R_5$ and $R_6$ are the same or different, and are each independently H, or an alkyl group having from 1 to 20 carbon atoms, which are optionally substituted by oxygen atoms;

$A^-$ is an inorganic or organic anion.

2. The block modified polysiloxane of claim 1, wherein M is a divalent hydrocarbon radical, or $C_aH_{2a}$, where a is a positive integer between 2 and 4, and the M groups in the repeating units are the same or different;

m is a positive integer between 20 and 150, and n is a positive integer between 70 and 300.

3. A block-modified linear or cyclic polysiloxane copolymer, which contains repeating structural units having the following structural formulae (3) and/or (4):

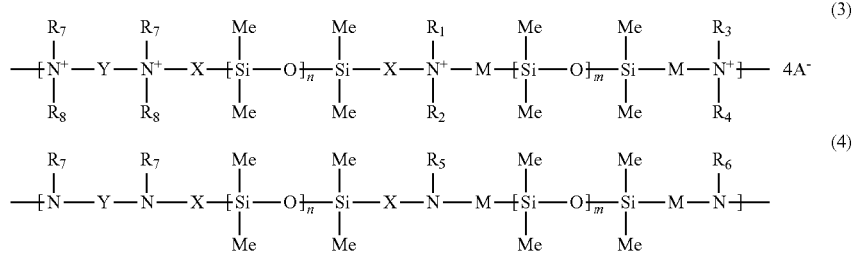

where Y is the structure $—B-[EO]^v[PO]_w—$, where EO is ethylene oxide and PO is propylene oxide;

B is a linear or branched C1-C6 alkylene group;

v is a positive integer of $\geq 200$;

w is a positive integer of 200;

$v+w \geq 1$;

$v/w$ is between 1.1 and 5;

where X is a divalent hydrocarbon radical having at least 3 carbon atoms, which contains at least one hydroxyl group and is interrupted by an oxygen atom, and the X groups in the repeating units are the same or different;

M is a divalent hydrocarbon radical of the formula $C_2H_{2a}$, where a is a positive integer between 1 and 10, and the M groups in the repeating units are the same or different;

N is a nitrogen atom;

m is a positive integer between 10 and 200;

n is a positive integer, between 50 and 350;

Me denotes methyl;

$R_1$, $R_2$, $R_3$ and $R_4$ are the same or different, and are each independently an alkyl group having from 1 to 4 carbon atoms or a benzyl group or H;

$R_5$ are the same or different, and are each independently H, or an alkyl group having from 1 to 20 carbon atoms, which are optionally substituted by oxygen atoms;

$R_6$ and $R_7$ are the same or different, and are each independently H, or an alkyl group having from 1 to 20 carbon atoms;

$A^-$ is an inorganic or organic anion.

4. The block-modified polysiloxane of claim 3, wherein X is a ring opened epoxide selected from the group consisting of $(C_aH_{2a}O)_b—CH(CH_2OH) (CH_2)_f CH(CH_2OH)—$ $(C_aH_{2a}O)_b—CH_2CH(OH) (CH_2)_f CH(CH_2OH)—$, $(C_aH_{2a}O)_b—(CH_2)_f OCH_2CH(OH)CH_2—$, $(C_aH_{2a}O)_b—(CH_2)_f OCH_2 CH(CH_2(OH))—$, and mixtures thereof, where a are the same or different, and are integers between 2 and 4; b is the same or different, and is an integer between 0 and 100; f is an integer between 2 and 6.

5. The block-modified linear or cyclic polysiloxane copolymer of claim 3 prepared by a reaction of a mixture of raw materials comprising:

(A) an epoxy-functional silicone oil;

(B) a polyetheramine; and (C) an aminoalkylsilicone oil.

6. The composition of claim 5, wherein the epoxy-functional silicone oil (A) is a polydimethylsiloxane terminated at both ends with an epoxy-functional group.

7. The composition of claim 5, wherein the epoxyalkyl silicone oil (A) is a polydimethylsiloxane terminated at both ends with an epoxy-functional group having the following structural formula (5):

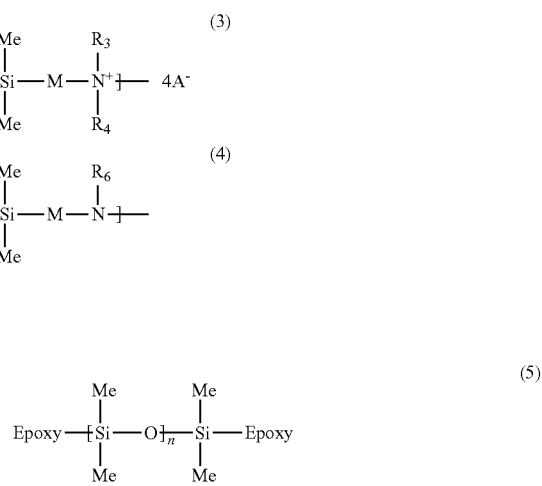

where n is a positive integer, between 50 and 350;

Me denotes methyl; and

Epoxy is selected from the group consisting of $(C_aH_{2a}O)_b—(CH_2)_f OCH_2CHOCH_2$ where a is an integer between 2 and 4; b can be the same or different, and is an integer between 0 and 100; f is an integer between 2 and 6;

ω-(3,4-epoxycyclohexyl)alkylene,

β-(3,4-epoxycyclohexyl)ethylene,

β-(3,4-epoxycyclohexyl)-O-methyl ethylene,

β(3,4-epoxy-4-methylcyclohexyl)-β-methyl ethylene, and mixtures thereof.

8. The composition of claim 5, wherein the polyetheramine (B) is a substance having the structural formula $NR_a—B-[EO]_v[PO]_w—NR_a$, where v is a number between 0 and 200, w is a number between 0 and 200

B is a linear or branched C2-C6 alkylene group;

R are the same or different, and is independently H, or an alkyl group having from 1 to 6 carbon atoms;

each a is the same or different, and is an integer between 1 and 4.

9. The composition of claim 8, wherein the aminoalkyl silicone oil (C) is a di-aminoalkyl-terminated polydimethylsiloxane.

10. The composition of claim 8, wherein the aminoalkyl silicone oil (C) is a di-3-aminopropyl-terminated polydimethylsiloxane having the structural formula (6):

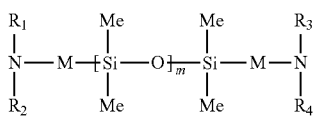 (6)

M is a divalent hydrocarbon radical, or $C_aH_{2a}$, where a is a positive integer between 1 and 10, and the M groups in the repeating units can be the same or different;

$R_1$, $R_2$, $R_3$ and $R_4$ are the same or different, and are each independently an alkyl group having from 1 to 4 carbon atoms or a benzyl group or H;

m is a positive integer between 10 and 200; and

Me denotes methyl.

11. The block-modified polysiloxane of claim 3, wherein a content of unopened epoxide groups is less than 0.05 mmol/g, measured by nuclear magnetic resonance (NMR).

12. The block-modified polysiloxane of claim 3, which have an amine value of from 0.01 to 0.5 meq/g, measured by nuclear magnetic resonance (NMR).

13. The composition of claim 5, wherein the molar ratio of the epoxide groups in epoxyalkyl silicone oil (A), to the amino-functional groups in polyetheramine (B), ranges from 1.01 to 2.

14. The composition of claim 5, wherein the molar ratio of the epoxide groups in epoxyalkyl silicone oil (A), to the amino-functional groups in aminoalkyl silicone oil (C), ranges from 1 to 5.

15. The composition of claim 5, wherein the weight ratio of Component (B), based on the total weight of epoxyalkyl silicone oil (A), polyetheramine (B), and aminoalkyl silicone oil (C), ranges from 1 to 15 wt %.

16. The composition of claim 5, wherein the weight ratio of Component (C), based on the total weight of epoxy alkyl silicone oil (A), polyetheramine (B), and aminoalkyl silicone oil (C), ranges from 5 to 30 wt %.

17. The block-modified polysiloxane of claim 5, prepared by a process comprising:
reacting epoxyalkyl silicone oil (A), with polyetheramine (B), and then aminoalkyl silicone oil (C), is added into the system for further reaction.

18. An aqueous emulsion comprising the block-modified polysiloxane of claim 3, having a particle size D50 of from 10 to 100 nm.

19. In a process of textile finishing, the improvement comprising employing a composition of claim 5.

20. In a process wherein a textile or fabric softener, smoothing agent, or finish is employed, the improvement comprising selecting as said textile or fabric softener, smoothing agent, or finish, an emulsion of claim 18.

* * * * *

UNITED STATES PATENT AND TRADEMARK OFFICE
CERTIFICATE OF CORRECTION

PATENT NO. : 11,746,193 B2
APPLICATION NO. : 17/292168
DATED : September 5, 2023
INVENTOR(S) : Heng Yang et al.

It is certified that error appears in the above-identified patent and that said Letters Patent is hereby corrected as shown below:

In the Claims

Column 11, Line 32, Claim 3:
After "v is a positive integer of"
Delete "≥200" and
Insert -- ≤200 --.

Column 11, Line 33, Claim 3:
After "w is a positive integer"
Delete "of 200" and
Insert -- ≤200 --.

Column 12, Line 11, Claim 7:
Delete "epoxyalkyl silicone oil (A),"
Insert -- epoxy-functional silicone oil (A), --.

Column 12, Line 47, Claim 7:
After "β-(3,4-epoxycyclohexyl)ethylene,"
Delete "β-(3,4-epoxycyclohexyl)-O-methylethylene," and
Insert -- β-(3,4-epoxycyclohexyl)-β-methylethylene, --.

Column 13, Line 24, Claim 13:
Delete "epoxyalkyl silicone oil (A),"
Insert -- epoxy-functional silicone oil (A), --.

Column 14, Line 6, Claim 14:
Delete "epoxyalkyl silicone oil (A),"
Insert -- epoxy-functional silicone oil (A), --.

Signed and Sealed this
Twenty-fifth Day of June, 2024

*Katherine Kelly Vidal*

Katherine Kelly Vidal
*Director of the United States Patent and Trademark Office*

Column 14, Line 6, Claim 15:
Delete "epoxyalkyl silicone oil (A),"
Insert -- epoxy-functional silicone oil (A), --.

Column 14, Line 14, Claim 17:
Delete "epoxyalkyl silicone oil (A),"
Insert -- epoxy-functional silicone oil (A), --.